United States Patent

Kubo et al.

[11] Patent Number: 4,569,775
[45] Date of Patent: * Feb. 11, 1986

[54] METHOD FOR MANUFACTURING A MAGNETIC POWDER FOR HIGH DENSITY MAGNETIC RECORDING

[75] Inventors: Osamu Kubo, Yokohama; Tadashi Ido, Ebina; Tutomu Nomura; Koichiro Inomata, both of Yokohama, all of Japan

[73] Assignee: Tokyo Shibaura Denki Kabushiki Kaisha, Kawasaki, Japan

[*] Notice: The portion of the term of this patent subsequent to Jul. 27, 1999 has been disclaimed.

[21] Appl. No.: 417,441

[22] Filed: Sep. 8, 1982

[51] Int. Cl.$^4$ .............................................. C04B 35/26
[52] U.S. Cl. ............................ 252/62.59; 252/62.58; 252/62.63
[58] Field of Search ............... 252/62.58, 62.59, 62.63; 423/594

[56] References Cited

U.S. PATENT DOCUMENTS 4,341,648  7/1982  Kubo et al. ........................ 252/62.59

OTHER PUBLICATIONS

M. Fahmy et al., "Magnetic Properties, Microstructure, and Ultra-Structure of Partially Crystallised $B_2O_3$-BaO-$Fe_2O_3$ Glass," *Physics and Chemistry of Glasses*, vol. 13, No. 2; 1972; pp. 21-26.

Hideo Tanigawa et al., "Studies on Magnetic Microcrystalline Produced by Crystallization of Glasses in the System $B_2O_3$-BaO-$Fe_2O_3$," *Osaka Kogyo Gigyutsu Shikenjo* (*Industrial Technology Laboratory*) Report, vol. 15; Oct. 1964; pp. 285-293.

B. T. Shirk et al., "Theoretical and Experimental Aspects of Coercivity Versus Particle Size for Barium Ferrite," *IEEE MAG*-7, 1971; pp. 659-663.

Primary Examiner—Jack Cooper
Attorney, Agent, or Firm—Oblon, Fisher, Spivak, McClelland & Maier

[57] ABSTRACT

A method for preparing a magnetic powder for high density magnetic recording includes melting a mixture containing the fundamental component of a hexagonal ferrite, a substituting component for reducing the coercive force, and boron trioxide as a glass forming substance in predetermined amounts. The resultant molten material is rapidly cooled to obtain an amorphous body which is then heat-treated to produce desired substituted type hexagonal ferrite particles in the glass matrix.

9 Claims, 9 Drawing Figures

METHOD FOR MANUFACTURING A MAGNETIC POWDER FOR HIGH DENSITY MAGNETIC RECORDING

BACKGROUND OF THE INVENTION

I. Field of the Invention

The present invention relates to a method for manufacturing a magnetic powder for high density magnetic recording and, more particulary, to a method for manufacturing a magnetic powder for vertical magnetic recording.

II. Description of the Prior Art

Magnetic recording has been conventionally based on magnetization along the longitudinal direction of the plane of the recording medium. However, when an attempt is made to record at a high density in such a recording system, the demagnetizing field within the reocrding medium increases. Thus, it is difficult to achieve high density recording with this recording system.

To the contrary, in a vertical magnetic recording system, the demagnetizing field within the recording medium decreases even when the recording density is increased, so that this system may be considered to be suitable for high density recording. With such a vertical magnetic recording system, it is necessary that the axis of easy magnetization be normal to the surface of the recording medium. Among such recording media, there is known a recording medium which is obtained by mixing a magnetic powder with a binder and coating the mixture on a tape.

As such a magnetic powder, hexagonal ferrites such as barium ferrite ($BaFe_{12}O_{19}$) are used. These hexagonal ferrite powders are in plate form and the axis of easy magnetization is normal to the plane of the surface so they are advantageous in that vertical orientation may be easily accomplished by magnetic field orientation processing or mechanical processing. However, for using the hexagonal ferrites for vertical magnetic recording powder, certain conditions must be satisfied.

For example, the hexagonal ferrites are too high in coercive force iHc (generally over 5,000 oersteds) to be recorded by the usual magnetic head. Thus, it is necessary to reduce the coercive force to a value suitable for vertical magnetic recording.

Further, it is preferred that the crystal size of the hexagonal ferrites be controlled within the range of 0.01–0.3 μm for vertical magnetic recording. When the crystal size is less than 0.01 μm, the ferromagnetism necessary for magnetic recording is not obtained, and when it exceeds 0.3 μm, magnetic recording may not be achieved at high density.

It is further required that the hexagonal ferrites be homogeneously dispersed in a medium such as a paint.

SUMMARY OF THE INVENTION

It is, therefore, an object of the present invention to provide a method for manufacturing a magnetic powder comprising magnetoplumbite type hexagonal ferrites having a relatively low coercive force suitable for vertical magnetic recording.

It is another object of the present invention to provide a method for manufacturing a magnetic powder for a magnetic recording at high density which has a well controlled particle size and which has improved homogeneous dispersibility in the medium.

In the present invention, metal oxide or metal oxide precursor components including A oxide or A oxide precursor, iron oxide or iron oxide precursor, cobalt oxide or cobalt oxide precursor, and M oxide or M oxide precursor of a substituted ferrite having the formula:

$$AFe_{12-2x}Co_xM_xO_{19} \text{ or } AFe_{12-3/2x}Co_xM_{\frac{1}{2}x}O_{19}$$

wherein A is at least one element selected from the group consisting of barium, strontium, lead and calcium, M is at least one tetravalent element selected from the group consisting of titanium and germanium or at least one pentavalent element selected from the group consisting of vanadium, niobium, antimony and tantalum, and x is a value from 0.5 to 1.1 are mixed together with boron trioxide as a glass forming substance in amounts with a triangular area whose verteces are a point (a) defind by $B_2O_3=0$ mol %, the A oxide or A oxide precursor=14.3 mol %, and a total of the iron oxide or iron oxide precursor plus the cobalt oxide or cobalt oxide precursor plus the M oxide or M oxide precursor=85.7 mol %; a point (b) defined by $B_2O_3=0$ mol %, the A oxide or A oxide precursor=16.7 mol %, and a total of the iron oxide or iron oxide precursor plus the cobalt oxide or cobalt oxide precursor plus the M oxide or M oxide precursor=83.8 mol %; and a point (c) defined by $B_2O_3=50$ mol %, the A oxide or A oxide precursor=50 mol %, and a total of the iron oxide or iron oxide precursor plus the cobalt oxide or cobalt oxide precursor plus the M oxide or M oxide precursor=0 mol % (excluding the line connecting the points (a) and (b)) in a view plotted along triangular coordinates with the amounts of the A oxide or A oxide precursor, $B_2O_3$, and a total of the iron oxide or iron oxide precursor plus the cobalt oxide or cobalt oxide precursor plus the M oxide or M oxide precursor being marked off along the sides of the triangle.

The mixture is melted into a molten material. The molten material is rapidly cooled to obtain an amorphous material. The amorphous material is then heat-treated to precipitate magnetoplumbite type substituted hexagonal ferrites as mutually separated fine particles in the amorphous material. Finally, the fine particles are separated from the amorphous material.

DETAILED DESCRIPTION OF THE PREFERRED EMBODIMENTS

Figure 1:
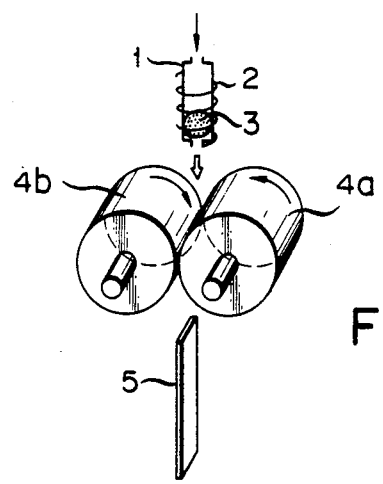
FIG. 1 is a schematic view illustrating a device for performing an embodiment of the method of the present invention.

The present invention is based on the finding that the particle size of the ferrite particles may be controlled within the desired range of 0.01 to 0.3 μm and the dispersion of the obtained fine particles in the medium is improved when the glass crystallizing technique is used wherein the components are melted and rapidly cooled, and are then heat-treated to precipitate the fine particles of ferrite in the glass stratum. The present invention is also based on the finding that ferrites suitable for magnetic recording may be obtained by using a certain kind of oxide or its precursor as a substituting component for reducing the coercive force of ferrites.

The respective components and the manufacturing conditions of the present invention will now be described in more detail.

Hexagonal Ferrite Fundamental Component

The magnetoplumbite type hexagonal ferrite fundamental components used in the method of the present invention include ferric oxide ($Fe_2O_3$) and an oxide represented by the formula AO. The oxide AO is at least one member selected from the group consisting of barium oxide (BaO), strontium oxide (SrO), lead oxide (PbO), and calcium oxide (CaO). Barium oxide is preferable as the oxide AO.

Substituting Component

As has been already described, hexagonal ferrites have a high coercive force and may not be used as the magnetic powder for magnetic recording as it is. The present inventors have found that the coercive force may be reduced by substituting a certain kind of element for the iron ions in the ferrite. The substituting element is cobalt and may be used in the form of an oxide, i.e., CoO, in the method of the present invention.

When the iron ions in the ferrite are replaced by the cobalt ions, the valence becomes deficient. To compensate for the valence without degrading the various characteristics of the ferrite, at least one tetravalent metal element selected from the group consisting of titanium and germanium may be added, or at least one pentavalent metal element selected from the group consisting of vanadium, niobium, antimony and tantalum may be added. These metals may be used in the form of oxides, that is, in the form of $TiO_2$, $GeO_2$, $V_2O_5$, $Nb_2O_5$, $Sb_2O_5$ and $Ta_2O_5$, in the method of the present invention.

Glass Forming Substance

The glass forming substance functions as a matrix in which the hexagonal system ferrite particles precipitate according to the method of the present invention and is boron trioxide ($B_2O_3$) in the present invention.

Component Ratio

The components are used in amounts sufficient to provide $$AO \cdot n \left[ \left( Fe_1 - \frac{2x}{12} Co \frac{x}{12} M \frac{x}{12} \right)_2 O_3 \right] \quad (I)$$

(wherein M is a tetravalent metal) or $$AO \cdot n \left[ \left( Fe_1 - \frac{3x}{24} Co \frac{x}{12} M \frac{x}{24} \right)_2 O_3 \right] \quad (II)$$

(wherein M is a pentavalent metal) as a hexagonal ferrite. In the above formula, x is 0.5 to 1.1 and n is about 5 to 6. When x is less than 0.5, the coercive force of the resultant ferrite exceeds 2,000 oersteds (Oe), and the coercive force reducing effects are not sufficient. When x is above 1.1, the coercive force becomes less than 200 Oe, so that adequate recording may not be achieved.

For obtaining the ferrite represented by formula (I), it is apparent that it is necessary to use AO in an amount of 1/5 to 1/6 time the moles of $Fe_2O_3$, and the molar ratio of $Fe_2O_3:CoO:MO_2$ becomes $$\left\{ \frac{1}{2} \left( 1 - \frac{2x}{12} \right) \right\} : \frac{x}{12} : \frac{x}{12} \approx 11:1:1 \text{ to } 4.45:1:1.$$

For obtaining the ferrite represented by formula (II), it is apparent that it is necessary to use AO in an amount of 1/5 to 1/6 time the moles of $Fe_2O_3$, and the molar ratio of $Fe_2O_3:CoO:MO_{2.5}$ becomes $$\left\{ \frac{1}{2} \left( 1 - \frac{3x}{24} \right) \right\} : \frac{x}{12} : \frac{x}{24} \approx 22.50:2:1 \text{ to } 9.40:2:1.$$

Substitution of $Fe^{3+}$ ions by $Co^{2+}$ and M ions proceeds substantially stoichiometrically. Accordingly, it suffices to use the AO component in an amount of 1/6 time the moles of $Fe_2O_3$, but it will not cause any problems if it is supplied in an amount exceeding this value.

The amount of the glass forming substance may only be sufficient to provide a matrix allowing precipitation of the fine ferrite particles therein and will be explained below in more detail.

Manufacturing Conditions

The above powder components are well mixed in a mixer or the like. The mixture is then melted at 1,200° to 1,450° C. and is rapidly cooled (e.g., at a rate of $10^5$° C. per second to room temperature) to obtain the amorphous material. The resultant amorphous material is heat-treated and the desired fine ferrite particles are obtained separated from each other in the glass matrix. The heat treatment for precipitation of the ferrite fine particles is generally performed at 700° to 850° C. for 2 hours or more, usually 4 to 10 hours, in the air.

The melting and cooling of the above mixture is conveniently performed with a device as shown in FIG. 1. This device includes a vertically disposed cylindrical platinum container 1 which has openings at both ends and is surrounded by a high frequency heater 2. The device further includes below the container a pair of rolls 4a and 4b for rotational movement in opposite directions at a rate of 1,000 r.p.m., for example. A raw material mixture 3 is placed in the container 1 and heated by the heater 2 to be melted. Air or oxygen pressure is exerted from the upper end opening of the container 1 on the molten material to force it from the lower end opening over the pair of rolls 4a and 4b for rapid cooling. A homogeneous amorphous ribbon 5 is obtained from between the rolls 4a and 4b. Thereafter, the ribbon is heat-treated in the above manner.

After thus precipitating the desired fine ferrite particles in the glass matrix, the glass matrix is removed by an acid such as dilute acetic acid. The remaining powder is rinsed with water and dried to obtain the desired fine ferrite particles.

The coercive force of the ferrite thus obtained is suitable for magnetic recording since some of the iron ions are replaced by cobalt ions, and the particle size is within the proper range (0.01 to 0.3 μm), and the particles are not coagulated but are separate from each other.

When $B_2O_3$ is used as the glass forming substance, a phase of $AO \cdot B_2O_3$ is precipitated when the amorphous material is heat-treated. The phase was found to be crystallized prior to the ferrite, by the results of differential thermal analysis and X-ray diffractiometry. Therefore, when the AO is in the amount equimole or less of $B_2O_3$, the AO reacts completely with the $B_2O_3$ producing no ferrite. The $Fe_2O_3$ is completely crystallized into $\alpha$-$Fe_2O_3$. Therefore, in order to obtain the desired magnetoplumbite type ferrite, the AO must be used in an amount which is the sum of the moles of $B_2O_3$ and $1/n$ (n is usually 5 to 6) time the moles of $Fe_2O_3$. Even when the AO is added in an amount exceeding the equimole amount of $B_2O_3$, a mixture of ferrite and $\alpha$-hematite is obtained when this extra amount is below $1/n$ time the moles of $Fe_2O_3$.

Further studies were made based on these findings. It was found that desired magnetoplumbite type ferrites are obtained on a line satisfying $X = Y + 1/6 Z$ where the amount of AO is X mol %, the amount of $B_2O_3$ is Y mol % and the amount of $Fe_2O_3$ is Z mol % (the line connecting a point (a) at which AO=14.3 mol %, $B_2O_3=0$ mol %, and $Fe_2O_3=85.7$ mol %, and a point (c) at which AO=50 mol %, $B_2O_3=50$ mol %, and $Fe_2O_3=0$ mol % as the glass composition); on a line satisfying $X = Y + 1/5Z$ (the line connecting a point (b) at which AO=16.7 mol %, $B_2O_3=0$ mol %, and $Fe_2O_3=83.3$ mol %, and the point (c) at which AO=50 mol %, $B_2O_3=50$ mol % and $Fe_2O_3=0$ mol % as the glass composition); and the composition area surrounded by these two lines (excluding the line connecting the points (a) and (b)).

The characteristics of the ferrite obtained in the area where the magnetoplumbite type ferrite is precipitated, i.e., in the area where the precipitation is effected in a molar ratio of $AO/B_2O_3 > 1$, were evaluated. The ferrite obtained in the area where $AO/B_2O_3 > 1$ and the amount of AO is less than the sum of the amount of $B_2O_3$ and 1/6 time the moles of $Fe_2O_3$ is mixed with $\alpha$-$Fe_2O_3$. Consequently, its saturation magnetization as the powder is low, and the rectangular ratio of the magnetization curve of the powder is degraded so that the ferrite is not suitable for magnetic recording.

On the other hand, in the area where the amount of AO exceeds the required amount for precipitating the ferrite ($X > Y + 1/5Z$), the crystal particle size greatly depends on the temperature of the heat treatment, and the variation in the saturation magnetization is great with the change in the temperature of the heat treatment. However, with the ferrite obtained within this area, when the crystal particle size is great, the saturation magnetization is great; whereas when particle size is controlled to be less than 0.3 $\mu$m, the saturation magnetization is greatly reduced and it becomes difficult to control the particle size with the temperature of the heat treatment.

Further, when the amount of AO is within the area where it is sufficient to produce the ferrite stratum ($Y + 1/6Z < X < Y + 1/5Z$), the particle size of the ferrite does not change very much with the change in temperature of the heat treatment, and the saturation magnetization is not disadvantageously reduced with a particle size of less than 0.3 $\mu$m. It is confirmed that ion substitution for control of the coercive force is possible within these areas.

The present invention will now be described with reference to its examples.

EXAMPLE 1

Figure 3:
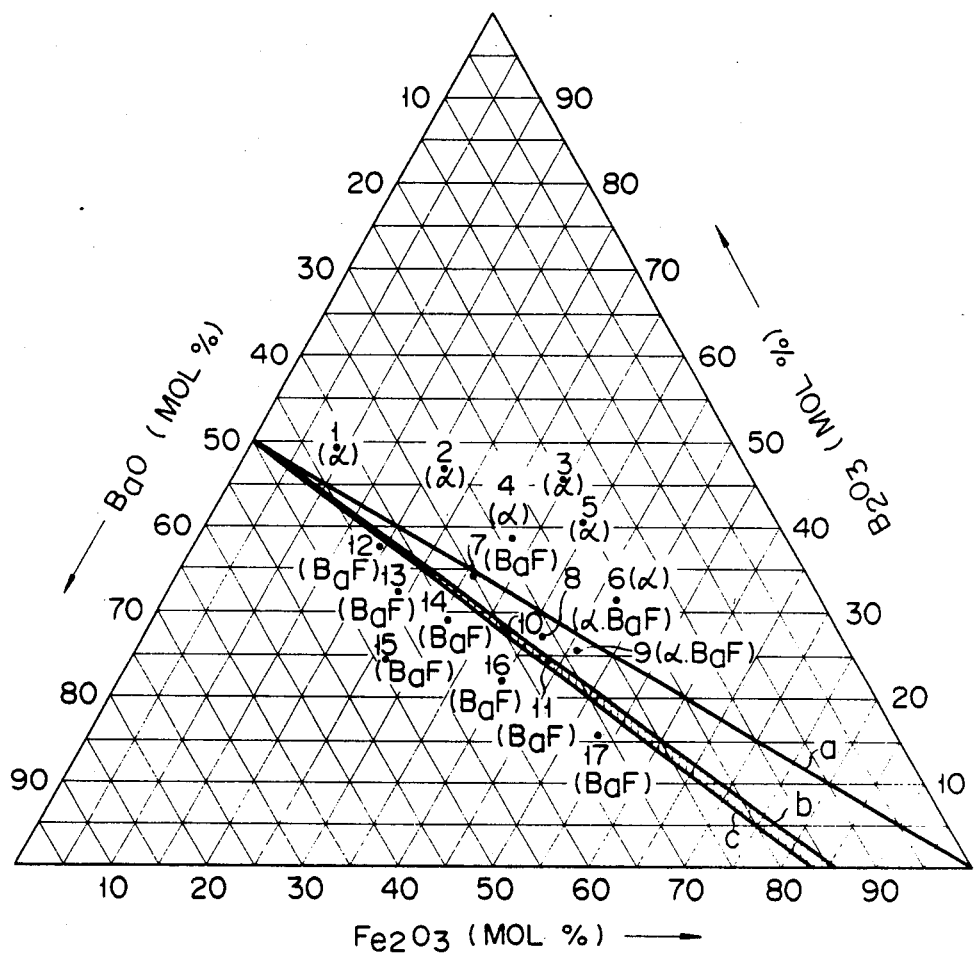
FIG. 3 shows the ratio of the raw materials used in the embodiment of the present invention as plotted along triangular coordinates.

The substituted type Ba ferrite $BaFe_{12-2x}Ti_xCo_xO_{19}$ was manufactured. X was selected to be 0.7 and the ratio of each component was as shown in the view plotted along the triangular coordinates (FIG. 3). In this view, BaO, $B_2O_3$ and $Fe_2O_3$ are at the vertices and their ratios are shown in mol %. The amount of $Fe_2O_3$ includes the molar amount of the substituting components, i.e., $TiO_2$ and CoO. Each material is shown by a dot mark, and the sample number is attached to it.

The raw materials were well mixed in a mixer and the mixture was placed in a platinum container 1 as shown in FIG. 1. The mixture was then heated to 1,350° C. with a high frequency heater 2 for melting. Thereafter, pressure of air or $O_2$ gas was exerted from the top of the platinum container 1 to force the mixture over the pair of rolls 4a and 4b, each 20 cm in diameter and rotating at 1,000 r.p.m., to rapidly cool the mixture. An amorphous ribbon 5 of 50 $\mu$m thickness was thus prepared.

This amorphous ribbon was found by X-ray diffractiometry to be a completely homogeneous amorphous body.

The resultant amorphous ribbon was heat-treated in an electric furnace at 700°–850° C. for 10 hours in an air atmosphere. After dissolving the heat-treated ribbon in dilute acetic acid, the remaining powder was rinsed with water and dried.

FIG. 3 shows various main kinds of crystal matrices of the obtained fine particles corresponding to the glass. compositions. Those marked with an ($\alpha$) are the crystal matrix with $\alpha$-$Fe_2O_3$ as the main component. Those marked with (BaF) indicate that they are the substituted type Ba ferrite strata, and those represented with ($\alpha$, BaF) indicate that both $\alpha$-$Fe_2O_3$ and Ba ferrite precipitated. Among the three inclined lines in the figure, the line (a) is the line satisfying $BaO/B_2O_3 = 1$; the line (b) is the line satisfying $X = Y + 1/6Z$ wherein the amount of BaO is X mol %, the amount of $B_2O_3$ is Y mol %, and the amount of $Fe_2O_3$ (including $TiO_2$ and CoO) is Z mol %, and the line (c) is the line satisfying $X = Y + 1/5Z$. It is seen from this view plotted along the triangular coordinates that $\alpha$-$Fe_2O_3$ alone was precipitated in the area satisfying $BaO/B_2O_3 > 1$ from the boundary line (a) satisfying $BaO/B_2O_3 = 1$, and Ba ferrite begins to be precipitated in the area satisfying $BaO/B_2O_3 < 1$. It is also seen that Ba ferrite and $\alpha$-$Fe_2O_3$ are precipitated in admixture between the boundaries (a) and (b). In the area where the BaO is in a greater amount than the boundary line (b), the Ba ferrite stratum is precipitated. In the area where the BaO is in a greater amount than the boundary line (c), the extra BaO which does not constitute the Ba ferrite is preseht in the amorphous body so that BaO dissolves during the acid rinsing process and the Ba ferrite stratum is obtained.

Figure 4:
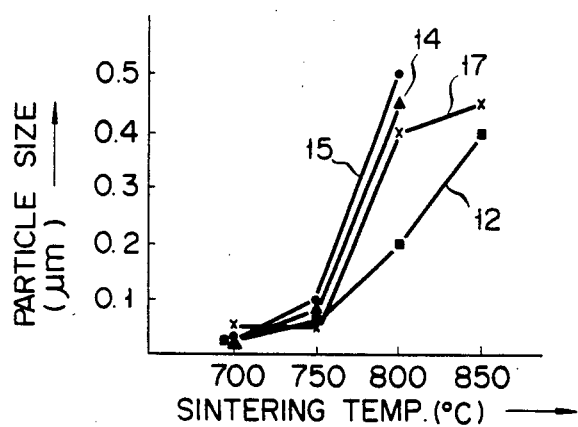
FIGS. 4 through 9 are graphs illustrating the characteristics of the magnetic powders obtained by the method of the present invention.
Figure 5:
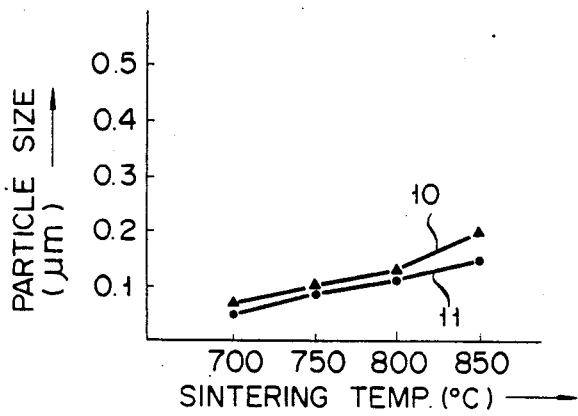
Figure 6:
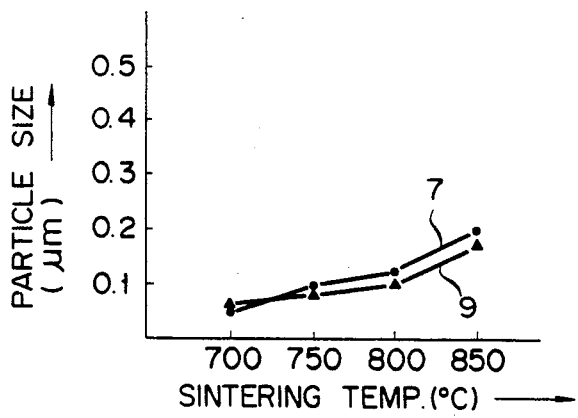

Among the various characteristics of the substituted type Ba ferrite precipitated in the area satisfying $BaO/B_2O_3 > 1$, the dependence of the particle size on the temperature of the heat treatment was as shown in FIGS. 4 through 6. FIG. 4 illustrates the case in which glass compositions 12, 14, 15 and 17 were used which fall in the excess BaO area from the boundary line (c). FIG. 5 illustrates the case in which glass compositions 10 and 11 are used which fall in the area bounded by the boundary lines (b) and (c). FIG. 6 shows the case wherein glass compositions 7 and 9 were used which fall in the area bounded by the boundary lines (a) and (b). In these figures, all the numerals correspond to the glass compositions. It is seen from these results that the dependence of the particle size on the temperature of the heat treatment is extremely great in the composition areas 12, 14, 15 and 17 where the excess BaO is present, and it is relatively small in the other composition areas.

Figure 7:
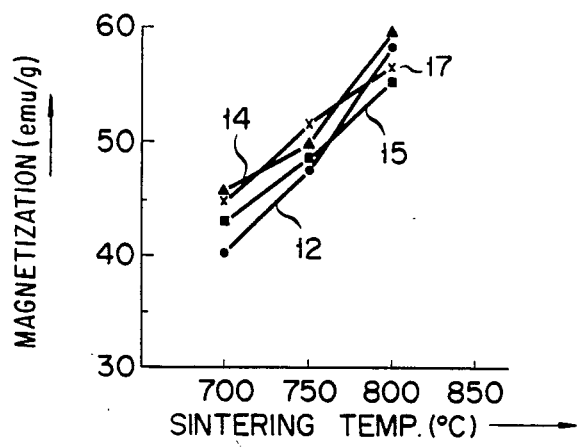
Figure 8:
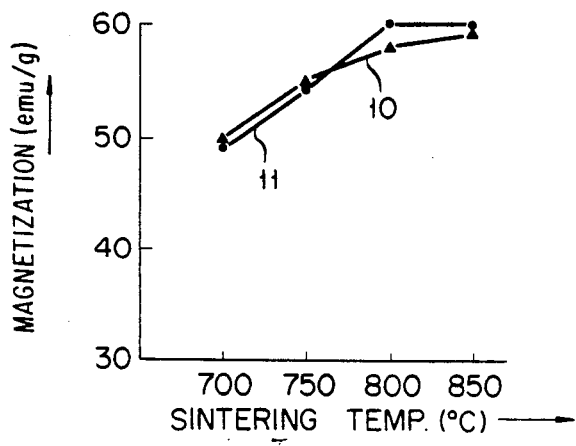
Figure 9:
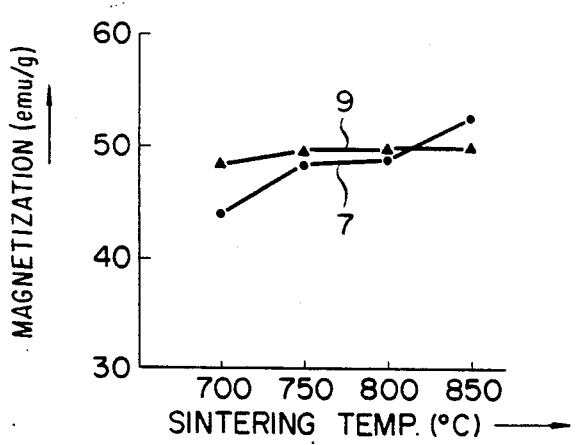

FIGS. 7 through 9 show the temperature dependence of the saturation magnetization $\sigma_g$ (emu/g) of the Ba ferrites precipitated using the glass compositions 7, 9, 10, 11, 12, 14 and 15, wherein FIG. 7 shows the case corresponding to the excess BaO area from the boundary line (c), FIG. 8 shows the case corresponding to the area bounded by the boundary lines (b) and (c), and FIG. 9 shows the case corresponding to the area bounded by the boundary lines (a) and (b). In these figures, the numerals correspond to the glass compositions. The saturation magnetization shows a similar dependency on the temperature of the heat treatment as in the case of the particle size. In the excess BaO area from the boundary line (c), the dependence of the saturation magnetization $\sigma_g$ on the temperature of the heat treatment is great. Although it is as great as $\sigma_g=60$ emu/g with a particle size of 0.5 μm, it is as small as $\sigma_g=50$ emu/g with a particle size of 0.1 μm. In the area bounded by the boundary lines (b) and (c), the dependence of the saturation magnetization $\sigma_g$ on the temperature of the heat treatment is small and is over 55 emu/g with a particle size of 0.1 μm. In the area bounded by the boundary lines (a) and (b), the dependence of the saturation magnetization $\sigma_g$ on the temperature of the heat treatment is small. However, the saturation magnetization $\sigma_g$ is as small as about 50 emu/g since α-$Fe_2O_3$ is mixed in which is almost a nonmagnetic material.

Table 1 below shows the rectangular ratio (wherein $\sigma_r$ is the residual magnetization and $\sigma_s$ is the saturation magnetization) of the Ba ferrites precipitated from the above glass compositions. However, since the magnetic powder must satisfy the requirement of less than 0.3 μm particle size, particles of about 0.1 μm in particle size were selected for measurement. As the amount of the extra BaO becomes greater and as the amount of BaO becomes less where the Ba ferrite and the α-$Fe_2O_3$ are precipitated, the rectangular ratio is found to be reduced. It is found to be at its maximum value in the vicinity of the area where the Ba ferrite stratum is precipitated.

TABLE 1

| Sample No. | Rectangular ratio $\sigma_r/\sigma_s$ | Composition area |
|---|---|---|
| 12 | 0.43 | Excess BaO Areas |
| 14 | 0.38 | |
| 15 | 0.35 | |
| 17 | 0.48 | |
| 10 | 0.49 | Ba ferrite stratum areas |
| 11 | 0.49 | |
| 7 | 0.41 | Ba ferrite and α-$Fe_2O_3$ precipitating areas |
| 9 | 0.48 | |

In summary, it is seen from the above results that, in the excess BaO areas from the boundary of the ferrite stratum, the dependence of the particle size on the temperature of the heat treatment becomes great and the particle size control becomes difficult. With particles of less than 0.3 μm particle size, the saturation magnetization and the rectangular ratio are reduced so that these particles are not suitable as a magnetic recording powder. In the area where the amount of BaO is too small, matrices which are nonmagnetic such as α-$Fe_2O_3$ are produced so that the saturation magnetization is reduced, the rectangular ratio at the magnetization curve of the powder is reduced and the desired magnetic powder may not be obtainable. However, in the area of the Ba stratum (hatched areas in FIGS. 2 and 5), the dependence of the particle size on the temperature of the heat treatment is small, the particle size control is easy, and the saturation magnetization and rectangular ratio of the fine particles of less than 0.3 μm particle size are great, providing an effective magnetic powder for magnetic recording. Similar effects may be obtained when the Ba of the ferrite component is replaced by Sr, Pb or Ca.

Although part of the Fe was replaced by Co-Ti in the above embodiment, it is possible to use the substituting ions other than Ti-Co for controlling the coercive force. The corelation between the glass composition and the characteristics of the precipitated ferrite were found to be the same as the case where Ti-Co was used.

Although the components used in the method of the present invention were described as oxides, they may be in the form of precursors such as carbonates and hydroxides which may be converted into oxides by thermal decomposition or the like.

What we claim is:

1. A method for manufacturing a magnetic powder for high density magnetic recording, comprising:
   mixing, together with boron trioxide as a glass forming substance metal oxide or metal oxide precursor components including A oxide or A oxide precursor, iron oxide or iron oxide precursor, cobalt oxide or cobalt oxide precursor, and M oxide or M oxide precursor of a substituted ferrite having the formula:

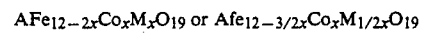

Figure 2:
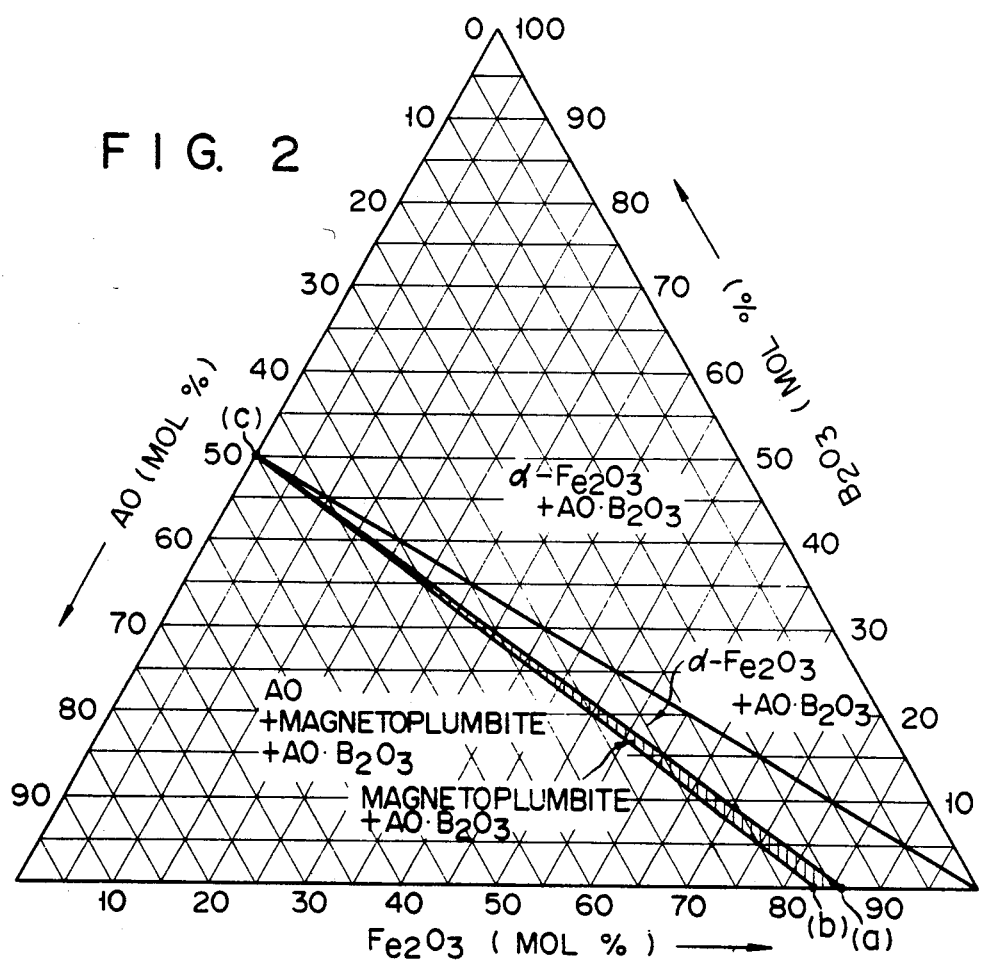
FIG. 2 shows the ratio of the raw materials used in the method of the present invention as plotted along triangular coordinates.

$AFe_{12-2x}Co_xM_xO_{19}$ or $AFe_{12-3/2x}Co_xM_{1/2x}O_{19}$ wherein A is at least one element selected from the group consisting of barium, strontium, lead and calcium, M is at least one tetravalent element selected from the group consisting of titanium and germanium or at least one pentavalent element selected from the group consisting of vanadium, niobium, anitmony and tantalum, and x is a value from 0.5 to 1.1, in amounts within a triangular area whose verteces are a point (a) defined by $B_2O_3=0$ mol %, the A oxide or A oxide precursor=14.3 mol %, and a total of the iron oxide or iron oxide precursor plus the coblat oxide or cobalt oxide precursor plus the M oxide or M oxide precursor=85.7 mol %, a point (b) defined by $B_2O_3=0$ mol %, the A oxide or A oxide precursor=16.7 mol %, and a total of the iron oxide or iron oxide precursor plus the cobalt oxide or cobalt oxide precursor plus the M oxide or M oxide precursor=83.8 mol %, and a point (c) defined by $B_2O_3=50$ mol %, the A oxide or A oxide precursor=50 mol %, and a total of the iron oxide or iron oxide precursor plus the cobalt oxide or cobalt oxide precursor plus the M oxide or M oxide precursor=0 mol %, as described by the triangular area (b) (c) (a) of FIG. 2; (excluding the line connecting the points (a) and (b))
melting the mixture into a molten material;
rapidly cooling the molten material to obtain an amorphous material;

heat-treating the amorphous material to precipitate a substituted hexogonal ferrite as mutually separated fine particles in a glass matrix; and separating out the fine particles from the glass matrix.

2. The method as claimed in claim 1, wherein M is a tetravalent metal.

3. The method as claimed in claim 2, wherein the molar ratio of $Fe_2O_3:CoO:MO_2$ is about 4.45:1:1 to 11:1:1.

4. The method as claimed in claim 3, wherein A is barium.

5. The method as claimed in claim 1, wherein M is a pentavalent metal.

6. The method as claimed in claim 5, wherein the molar ratio of $Fe_2O_3CoO:MO_{2.5}$ is about 9.40:2:1 to 22.50:2:1.

7. The method as claimed in claim 6, wherein A is barium.

8. The method as claimed in any one of claims 1 to 7, wherein the heat treatment is performed at 700° to 850° C. for 2 hours or more.

9. The method as claimed in claim 8, wherein said fine particles have a particle size of 0.01 to 0.3 μm.

* * * * *